(No Model.)
C. A. E. SCHICK, Sr.
ICE SHOE NAIL FOR HORSES, &c.
No. 537,648. Patented Apr. 16, 1895.
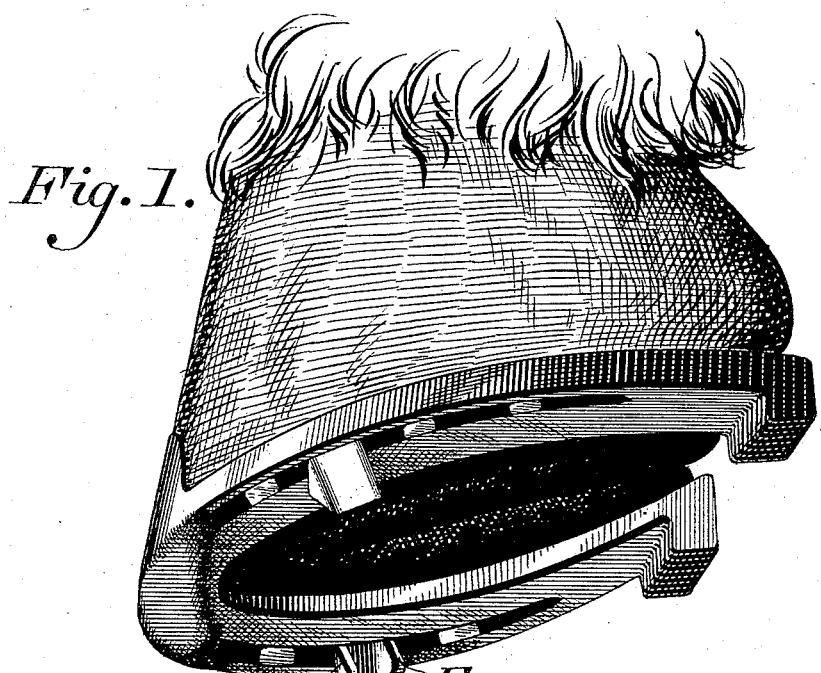
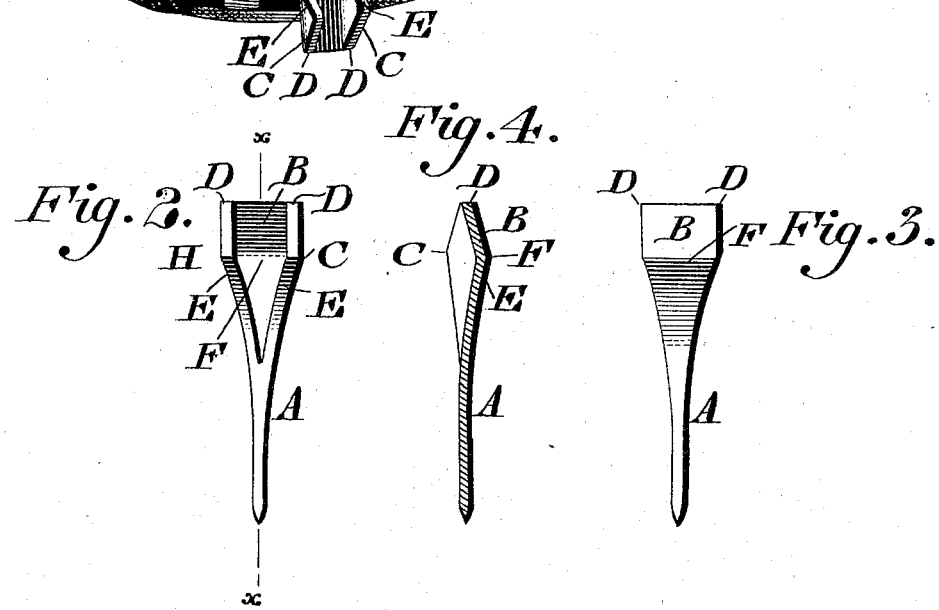
WITNESSES:
INVENTOR
Carl A. E. Schick Sr.
BY
ATTORNEY.

UNITED STATES PATENT OFFICE.

CARL A. E. SCHICK, SR., OF PHILADELPHIA, PENNSYLVANIA.

ICE-SHOE NAIL FOR HORSES, &c.

SPECIFICATION forming part of Letters Patent No. 537,648, dated April 16, 1895.

Application filed August 25, 1894. Serial No. 521,290. (No model.)

*To all whom it may concern:*

Be it known that I, CARL A. E. SCHICK, Sr., a citizen of the United States, residing in the city and county of Philadelphia, State of Pennsylvania, have invented a new and useful Improvement in Ice-Shoe Nails for Horses, &c., which improvement is fully set forth in the following specification and accompanying drawings.

My invention consists of a device for preventing horses and other animals from slipping on ice, smooth roads, &c., and consists of a nail to be driven through the shoe into the hoof, and formed with a head which constitutes a calk, the nail being removable, so that the head may be re-sharpened or reshaped when desired, and the nail afterward restored to position for further use.

Figure 4 represents a perspective view of an ice-shoe nail embodying my invention, the nail being in position on the hoof. Figs. 2 and 3 represent side elevations thereof. Fig. 4 represents a vertical section on line x, x, Fig. 2.

Similar letters of reference indicate corresponding parts in the several figures.

Referring to the drawings, A designates a nail of flaring form, the wide end B constituting the head. On the sides of said head are ears C, which taper toward the outer ends, so as to point the same as at D, as most clearly shown in Fig. 1, said ears also tapering toward the shank of the nail as at E, whereby when the nail is driven through the shoe into the hoof, the tapering portions E limit the penetration of the nail, and also wedge themselves in the nail openings, so that the head portion of the nail is firmly and tightly sustained on the shoe, this being further assisted by depressing the head B, so as to form the peak F, from which said head tapers in opposite direction, it being noticed that when the nail is in position, its head and ears present a calk, which is adapted to take firm hold of ice, smooth roads, &c., and thus prevent the animal from slipping, it being evident that the head and ears are strong in their nature, and that should the edges that come in contact with the ice, &c., become dull, or the head and ears battered, the nail may be withdrawn, and the relative parts re-sharpened and re-shaped, after which the nail may be driven into position and render further service.

In practice, the nail will be made of steel, and is not necessarily employed for holding the shoe in place, but may be carried along by the driver in his carriage or pocket, in order to use it when occasion requires. It will also be seen that the ears serve as crimps on the sides of the head and form a hollow structure which lightens the head, which is however reinforced by said ears, and thus its strength is maintained.

Having thus described my invention, what I claim as new, and desire to secure by Letters Patent, is—

An ice shoe nail having a flaring end forming a head, a shank, ears on the sides of said head, said ears tapering toward the outer ends and toward the shank, and a peak on said head, said peak and ears being adapted when the nail is in position to hold the same, substantially as described.

CARL A. E. SCHICK, SENIOR.

Witnesses:
JOHN A. WIEDERSHEIM,
R. H. GRAESER.